April 3, 1934.  I. S. CROCKER  1,953,796

METAL MIRROR

Filed March 29, 1932

Inventor:
Irving S. Crocker,
by *Charles V. Tulla*
His Attorney.

Patented Apr. 3, 1934

1,953,796

UNITED STATES PATENT OFFICE 1,953,796

METAL MIRROR

Irving S. Crocker, Lynn, Mass., assignor to General Electric Company, a corporation of New York Application March 29, 1932, Serial No. 601,762

1 Claim. (Cl. 88—1)

The present invention relates to metal mirrors and more especially metal mirrors designed for use in connection with searchlights.

An object of the present invention is to produce a metal mirror which is definitely superior to glass mirrors as regards mechanical durability under service conditions of shock and temperature variation.

Another object of the invention is to produce a metal mirror having a reflective efficiency comparable to that of the best silvered glass mirrors.

A further object of the invention is to produce a metal mirror wherein the reflecting surface is protected under service conditions.

A still further object of the invention is to produce a metal mirror wherein distortion under shock and temperature change does not exceed that of the best glass mirrors and in which there is no permanent set after stress is removed.

Other and further objects of the invention will be more apparent as the description thereof proceeds.

Figure 1:
Figure 2:
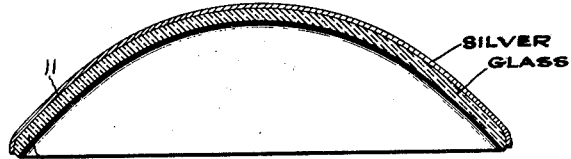
Figure 3:
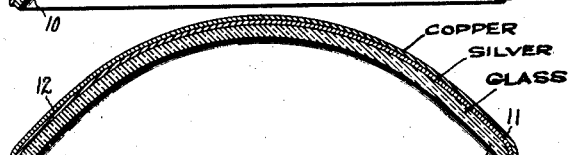
Figure 4:
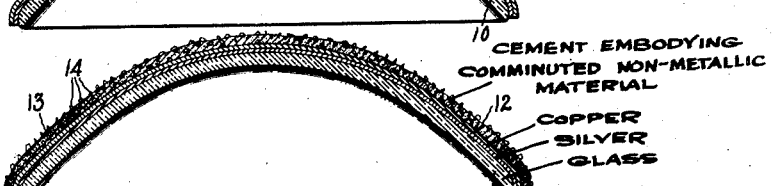
Figure 5:
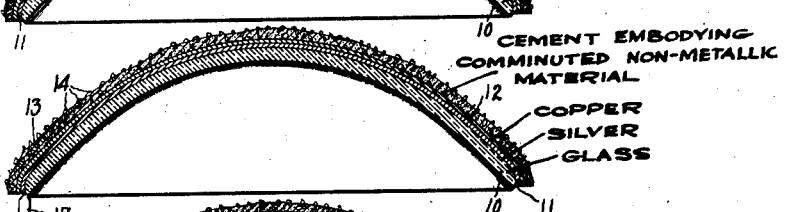
Figure 6:
Figure 7:
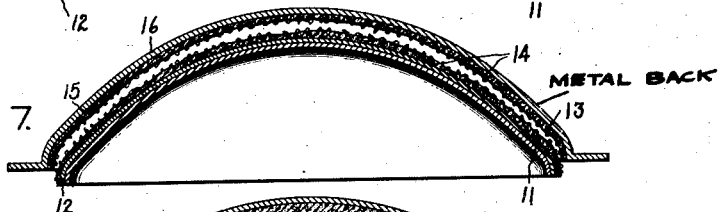
Figure 8:
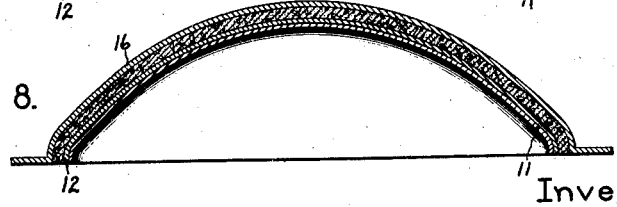

In the accompanying drawing forming part of the present application, Fig. 1 is a sectional view of a glass form employed in making the metal mirror of the invention; Fig. 2 is a sectional view showing the first coating deposited on the glass form; Fig. 3 is a sectional view illustrating further steps in the process of making the mirror; Fig. 4 is a sectional view showing the next steps in the manufacture of the mirror; Fig. 5 is a sectional view illustrating further steps in the production of the mirror and showing a portion of an air nozzle adapted to aid in separating the previously built up layers from the glass form; Fig. 6 is a sectional view of the mirror at the stage immediately after removal from the glass form; Fig. 7 is a sectional view illustrating the coated metal backing ready to receive the built up layers; and Fig. 8 is a sectional view of the completed mirror.

The necessity for metal mirrors having good reflecting surfaces and other qualities of glass mirrors arises particularly where such mirrors must be used in places where they are subject to damage from impact. For example, glass mirrors used in searchlights employed in military or naval operations are easily shattered by impact from bullets. It is hence desirable to replace such mirrors with metal constructions which shall be free from danger of damage by such impacts.

In order to construct a metal mirror fulfilling the objects of the invention, I proceed as follows: A base or form 10 of suitable material, for example glass, is first formed into the desired or required shape, for instance parabolic shape. A smooth rounded edge is ground on the form so that it tapers away from the front of the parabolic shape. This is necessary in order to prevent the metal subsequently plated thereon from locking the plating to the glass form and thus preventing the stripping of the plated metal therefrom without breakage of the glass.

The glass form is washed for two or three minutes with warm strong caustic soda solution followed by water and strong nitric acid and then by water again. The glass is then rubbed thoroughly with the best grade of whiting, using a felt pad and water. After thoroughly rinsing off the whiting with a stream of water, the glass is treated with a solution of stannous chloride, made, for example, by dissolving 1 ounce of stannous chloride in 3 gallons of water. The form is now kept wet with clear water until it is ready for silvering.

The glass form while still wet is placed on a silvering table and warmed with a stream of water at about 125°–150° F. A coat of silver 11 is then deposited in the usual way on the form until a proper thickness is obtained, for example .00005"–.00006" of silver. Care should be taken that the temperature of the solution is maintained between 55°–60° F., in order that the silvering may be properly accomplished. The form with the deposited silver coat is rinsed thoroughly with hot water and allowed to dry.

A coating of copper 12 is next electroplated on the silver coat. It is important to prevent the deposition of any copper between the silver and the glass. The edges of the silver coat must be so sealed to the glass as to prevent the entrance of the plating solution between the silver and the glass. This can be accomplished by covering the edges of the silver coat on the front face of the glass form with a suitable paint, for example a copper bronze paint. This effectively prevents the copper from entering between the silver coat and glass and lifting the former from the latter. A standard copper plating bath may be used employing a still bath with a current density of 20–25 amperes per square foot for a period of three hours. This produces a plate of about .005" in thickness, which is thick enough to trim easily and to hold the silver to the glass, but not so thick that it cannot be turned back from the edge at the proper time.

If desired, a flash coat of nickel can be put on the silver before the copper coat is put on. This is not important, however, where the mirror will not have to withstand high temperatures. The nickel coat will aid in the subsequent stripping of the deposited metals from the glass form. Such a coat may be put on the silver by plating in a standard nickel plating bath for 45-60 seconds at about 6 or 7 amperes per square foot.

After the plating operations, the mirror is removed from the bath, washed in cold water, and dried in a jet of air. The mirror is then carefully placed face up on a soft pad of felt or cloth. The edge of the metal is then trimmed with a sharp knife so as to leave about ½" on the front face of the glass. After seeing that there is no moisture under the edge of the metal, the edge is fastened to the glass by a narrow ribbon of grafting wax covering about ⅛" of the metal and ⅛" of the glass portions of the mirror that are not to be plated further; in this case the edge of the mirror is then covered with a heavy coat of shellac. Contacts can be remade by scraping off the shellac at two or three points on the rim and covering them with bronze paint. A solution of strong hydrochloric acid, e. g., 1 part HCl to 1 part water, is poured over the copper to remove any oxide of copper which may have formed. The mirror is then flushed with water and put back into the copper plating bath, where plating is continued for 48-50 hours in an agitated bath employing a current density of 45-60 amperes per square foot. It is then removed, washed with cold water, and dried with a stream of air.

A thin coat of adhesive or cement 13 is applied to the metal surface, preferably a cement comprising an alkyd resin such as is disclosed and claimed in the copending application of Almon G. Hovey, Serial No. 561,029, filed September 3, 1931, now Patent No. 1,925,903 dated September 5, 1933, and assigned to the assignee of the present invention. After permitting the cement to dry for a few minutes, and while it is still tacky, a second fairly heavy coat is applied and a layer of comminuted non-metallic material, such as fine rough gravel 14 is put on before the cement begins to dry. The inner surface 15 of a suitable metal back 16, formed, for example, from an aluminum alloy, is similarly treated. See Figure 7.

The mirror and metal back are separately dried for 24 hours and then fitted and cemented together. The cement should preferably be non-shrinkable and waterproof in character, so that there will be no change in the set of the cement which would produce distortion of the mirror while in use. The gravel assists in causing good adhesion between the mirror and the back.

Before the mirror is fitted to the metal back it is removed from the glass form. This is accomplished by placing the structure in a rubber blanket and putting the latter in hot water at a temperature of 150°-180° F. This expands the metal and the glass, but since the coefficient of expansion of the metal is about three times that of the glass, the metal pulls away cleanly from the glass without danger to it or to the latter. To aid in completing the separation of the metal from the glass, an air jet 17 is used. The jet is preferably shaped so that it has a thin nozzle or opening which can be inserted easily at the junction between the silver coat and glass form and air under pressure forced therebetween.

The mirror surface is, of course, adjusted to the correct focal point before it is cemented fast to the backing. The mirror and backing are weighted and allowed to dry 4 to 5 days. The silver surface is cleaned of any stains and dried, after which it is lacquered with a suitable lacquer, for example a nitrocellulose type of lacquer, in order to protect the silver from damage. A finish ring is put around the edge of the mirror and it is then complete.

Mirrors constructed in accordance with the present invention have shown efficiency of reflection ranges from 92-94%, and will withstand a temperature of 115° F. indefinitely.

What I claim as new and desire to secure by Letters Patent of the United States, is:

A metal mirror consisting of a silver reflecting surface, a coating of copper on said silver surface, a metal back, and a layer of cement embodying comminuted non-metallic material, between said copper surface and the metal back.

IRVING S. CROCKER.